United States Patent
Okada et al.

Patent Number: 5,919,567
Date of Patent: Jul. 6, 1999

[54] MAGNETIC HEAD

[75] Inventors: Masaru Okada; Hiromi Ito; Hirofumi Ouchi, all of Tokyo, Japan

[73] Assignee: Mitsubishi Denki Kabushiki Kaisha, Tokyo, Japan

[21] Appl. No.: 08/757,544

[22] Filed: Nov. 27, 1996

[30] Foreign Application Priority Data

May 28, 1996 [JP] Japan ..................................... 8-133766

[51] Int. Cl.$^6$ ........................... G11B 5/127; B32B 19/02; B32B 27/20; B32B 27/38
[52] U.S. Cl. ........................... 428/413; 428/418; 428/457; 428/469; 428/692; 428/693; 428/411.1; 428/472; 360/110; 360/126
[58] Field of Search .................................. 428/557, 413, 428/416, 418, 426, 432, 446, 450, 457, 469, 471, 472, 472.2, 692, 693, 411.1; 360/110, 125, 126, 127, 122; 549/512

[56] References Cited

U.S. PATENT DOCUMENTS

| | | | |
|---|---|---|---|
| 4,593,333 | 6/1986 | Yanagi | 360/125 |
| 5,171,769 | 12/1992 | Bull et al. | 523/447 |

FOREIGN PATENT DOCUMENTS

| | | |
|---|---|---|
| 59-160860 | 9/1984 | Japan . |
| 61-150109 | 7/1986 | Japan . |
| 3256213 | 11/1991 | Japan . |
| 8-255307 | 10/1996 | Japan . |

*Primary Examiner*—John J. Zimmerman
*Assistant Examiner*—Michael LaVilla
*Attorney, Agent, or Firm*—Birch, Stewart, Kolasch & Birch, LLP

[57] ABSTRACT

A magnetic head is disclosed which includes in a preferred embodiment a head core (1) sandwiched between a first slider (2) and a second slider (3) both bonded to the core (1), said first and second sliders (2) and (3) being made from a resin composition comprising an epoxy resin composition and a filler comprising silica having a coefficient of thermal expansion of from $5 \times 10^{-7}$ to $6 \times 10^{-7}/°$ C. as the main component and from 3 to 30 wt % at least one minor component selected from alumina, mullite, barium titanate, forsterite, steatite, and zircon, the amount of the filler being from 50 to 95 wt % based on the amount of the epoxy resin composition. The magnetic head is inexpensive, does not suffer deterioration of the magnetic characteristics of the head core, and is free from the problem of sticking to a floppy disk, head wear, or media wear.

6 Claims, 1 Drawing Sheet

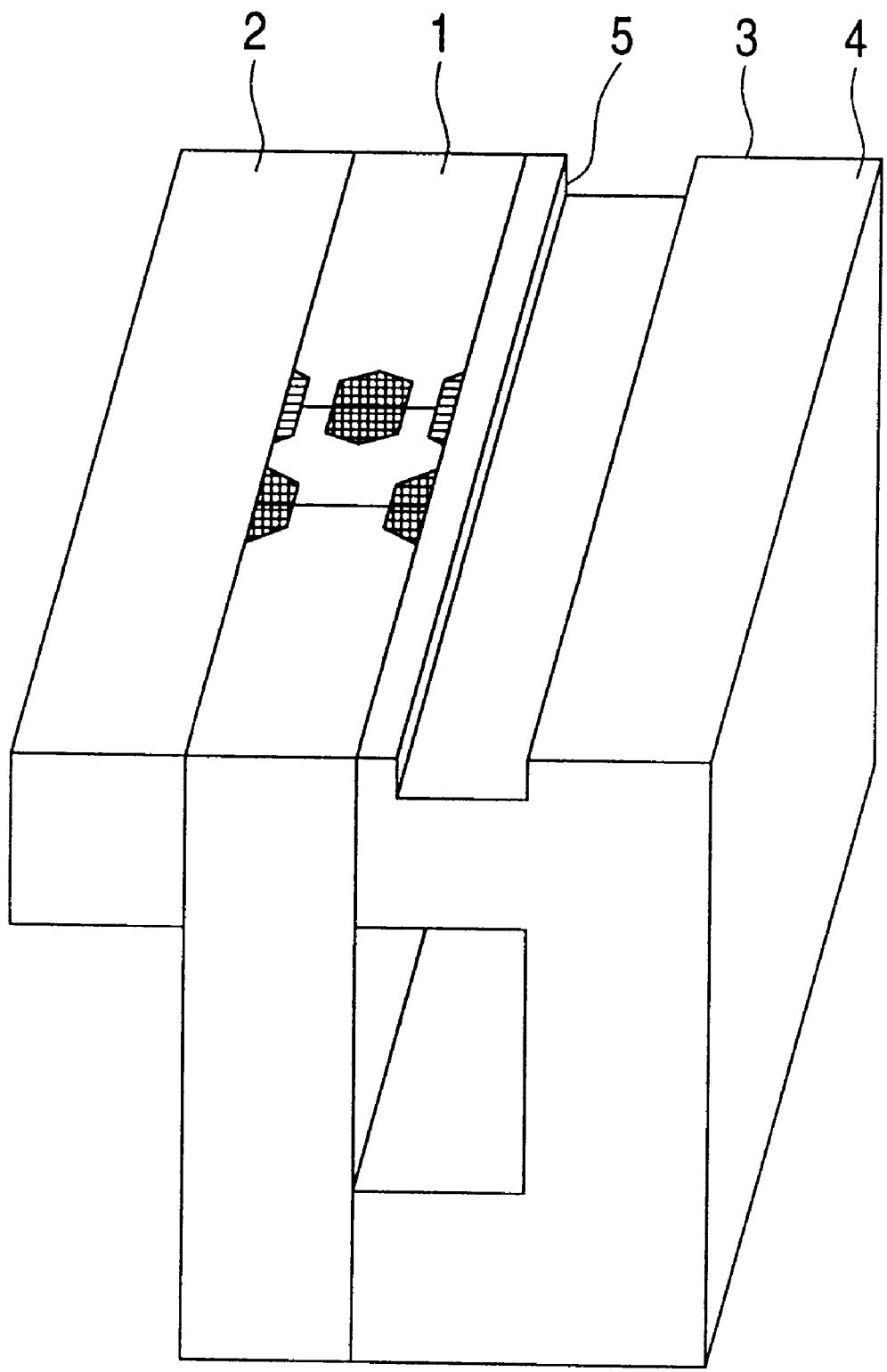

MAGNETIC HEAD

FIELD OF THE INVENTION

The present invention relates to a magnetic head for use in recording and reading magnetic information. More particularly, this invention relates to a magnetic head which produces remarkable effects especially when applied to a magnetic recording apparatus called an FDD (floppy disk drive).

BACKGROUND OF THE INVENTION

Conventional magnetic heads for FDDs, for example, have the constitution described in JP-A-3-256213 (hereinafter referred to as "reference 1"). (The term "JP-A" as used herein means an "unexamined published Japanese patent application.") As shown in the FIGS. 1 and 2 given in reference 1, a magnetic head for an FDD generally comprises a head core (electromagnetic converter element) sandwiched between two sliders (reinforcements) bonded thereto.

Ceramics such as calcium titanate and barium titanate are widely used as the materials of such sliders as shown in the FIG. 1 given in reference 1. Use of resins such as poly (phenylene sulfide) resins and polyimide resins as slider materials has been also proposed as shown in the FIG. 2 given in reference 1.

Ceramic sliders are produced through sintering under high-temperature and high-pressure conditions. With respect to resin sliders, use of injection molding has been proposed as a technique for mass-producing sliders of any desired shape, as disclosed in reference 1.

Since resins, when used alone, give sliders inferior in wear resistance and mechanical strength, a filler comprising a powder of an inorganic material such as, e.g., silica or alumina, is used as disclosed in JP-A-59-160860 (hereinafter referred to as reference 2) and JP-A-61-150109 (hereinafter referred to as reference 3).

In reference 2 is disclosed a resin slider containing fine particles of an inorganic material (e.g., alumina, silica, magnesia or zirconia) having a particle diameter of from 0.01 to 5 $\mu$m, in an amount of 0.1 to 50 wt %. In reference 3 is disclosed a resin slider containing particles of silica, quartz glass or alumina which have an average particle diameter of from 30 to 150 $\mu$m, in an amount of 50 to 90 wt %.

The sliders of conventional magnetic heads for FDDs are made of the materials described above, and have the following drawbacks. Production of sliders made of a ceramic such as calcium titanate or barium titanate necessitates expensive special equipment for high-temperature and high-pressure sintering in order to obtain a dense material.

Another drawback of ceramic sliders is that because of the high hardness of those ceramics, it is difficult to impart intricate shapes to the ceramic materials, resulting in an increased cost of magnetic-head production.

Furthermore, use of ceramic sliders poses a problem that when the magnetic head slides on a floppy disk, the floppy disk sticks to the magnetic head due to the liquefaction of the lubricant contained in the magnetic material of the floppy disk.

On the other hand, sliders made of resins such as poly (phenylene sulfide) resins or polyimide resins have a drawback that since such resins have a remarkably higher coefficient of thermal expansion than Mn—Zn ferrites used as head core materials, bonding of the sliders to a head core material results in a considerable stress imposed on the head core (after bonding in the case where the adhesive used is a thermosetting one, or when the ambient temperature changes in the case where the adhesive used is a cold-setting one), whereby the magnetic characteristics of the head core are significantly deteriorated.

It is therefore essential that a fine powder of an inorganic material having a low coefficient of thermal expansion be used as a filler for a resin used as a slider material.

The coefficients of thermal expansion of resins are generally high as stated above, e.g., from $600 \times 10^{-7}$ to $700 \times 10^{-7}$/° C. for thermoset epoxy resins, whereas those of Mn—Zn ferrites are from $100 \times 10^{-7}$ to $130 \times 10^{-7}$/° C.

Of the fillers use of which is disclosed in references 2 and 3, magnesia has the highest coefficient of thermal expansion, and the fillers having the next highest coefficient of thermal expansion are zirconia and alumina. These fillers, having coefficients of thermal expansion on the same order as Mn—Zn ferrites (around $100 \times 10^{-7}$/° C.) and having specific gravities several times those of resins, bring about little decrease in the coefficient of thermal expansion when incorporated in amounts up to about 50% by weight and do not contribute to the prevention of the deterioration of head core magnetic characteristics. If those fillers are incorporated in an amount close to 90% by weight as described in reference 3, this impairs the flowability of the uncured resin.

Silica has a far lower coefficient of thermal expansion (from $5 \times 10^{-7}$ to $6 \times 10^{-7}$/° C.), and the specific gravity thereof is as low as 2.2. Silica is hence a suitable filler for adjusting the coefficient of thermal expansion to that of a head core. (It should be noted that there are crystalline silica and amorphous silica, and crystalline silica has too high a coefficient of thermal expansion and is hence unsuitable for use in reducing the coefficient of thermal expansion.)

However, silica has a problem that it is inferior to alumina, magnesia, and zirconia in resistance to wearing by floppy disks and in mechanical strength. It is known that the hardness (Vickers hardness) of silica, which is a measure of wear resistance, is as low as about 500, whereas the hardness of alumina is as high as around 2,000 (the hardness of $\gamma$-$Fe_2O_3$, used as a magnetic material for floppy disks, is about 1,300). However, a magnetic head having a slider containing alumina in an amount exceeding 30% by weight has a problem that it is unsuitable for practical use because the floppy disk sliding on the magnetic head suffers wearing in its sliding part (hereinafter referred to as media wear).

SUMMARY OF THE INVENTION

The present invention has been achieved in order to eliminate the problems described above.

An object of the present invention is to obtain a magnetic head which is inexpensive, does not suffer deterioration of the magnetic characteristics of the head core, and is free from the problem of sticking to a floppy disk, head wear, or media wear.

The present invention provides, as described in claim 1, a magnetic head comprising a head core sandwiched between sliders bonded thereto, said sliders each being made from a resin composition comprising an epoxy resin composition and a filler comprising silica ($SiO_2$) having a coefficient of thermal expansion of from $5 \times 10^{-7}$ to $6 \times 10^{-7}$/° C. as the main component and from 3 to 30 wt % at least one minor component selected from alumina ($Al_2O_3$), mullite ($3Al_2O_3.2SiO_2$), calcium titanate ($CaTiO_3$), barium titanate ($BaTiO_3$), forsterite ($2MgO.SiO_2$), steatite ($MgO.SiO_2$), and zircon ($ZrO_2.SiO_2$), the amount of said filler being from 50 to 95 wt % based on the amount of the epoxy resin composition.

According to the invention of claim 2, in the magnetic head as described in claim 1, the epoxy resin composition contains at least one member selected from epoxy resins represented by formulae (1) to (4):

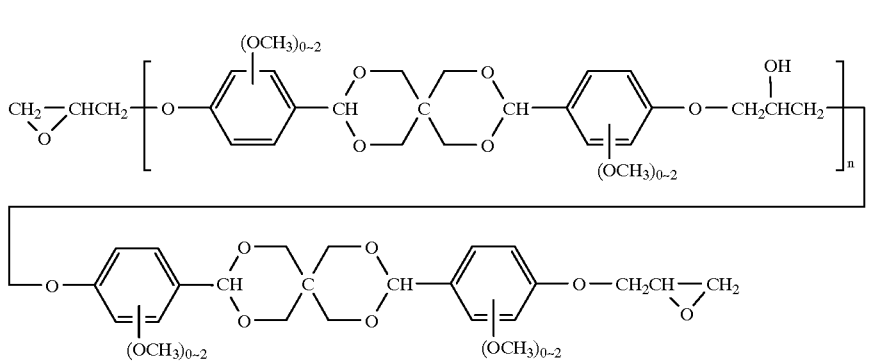

(1)

wherein n represents an integer of from 0 to 4 on the average;

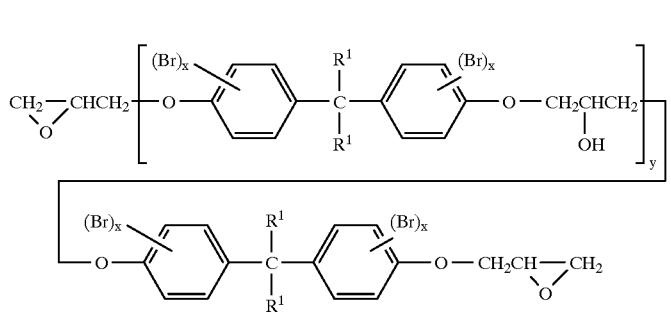

(2)

wherein $R^1$'s each independently represents a hydrogen atom or a methyl group, x's each independently represents an integer of from 1 to 4, and y represents an integer of from 0 to 4 on the average;

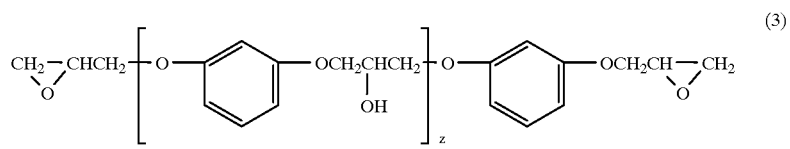

(3)

wherein z represents an integer of from 0 to 4 on the average;

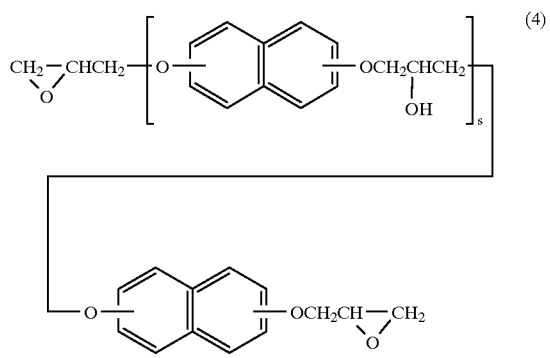

(4)

wherein s represents an integer of from 0 to 4 on the average.

According to the invention of claim 3 in the magnetic head as described in claim 1, the epoxy resin composition contains at least one member selected from bisphenol A epoxy resins, bisphenol F epoxy resins, and epoxy resins having a biphenyl skeleton.

According to the invention of claim 4, in the magnetic head as described in claim 2 or 3, the epoxy resin composition contains an acid anhydride, a curing accelerator, and a coupling agent as additives, the coupling agent comprising at least one member selected from epoxysilane coupling agents, phenylaminosilane coupling agents, mercaptosilane coupling agents, and titanate coupling agents, the amount of the acid anhydride being such that the ratio of the number of the acid anhydride groups thereof to the number of the epoxy groups of the epoxy resin is from 0.5 to 1.5, the amount of the curing accelerator being from 0.05 to 10 parts by weight per 100 parts by weight of the epoxy resin, and the amount of the coupling agent being from 0.5 to 5 parts by weight per 100 parts by weight of the epoxy resin.

According to the invention of claim 5, in the magnetic head as described in claim 1, the filler comprises a filler (A) having an average particle diameter of from 0.2 to 1.0 μm, a filler (B) having an average particle diameter from 10 to 15 times that of the filler (A), and a filler (C) having an average particle diameter from 50 to 80 times that of the filler (A), the proportion of the filler (A) to the filler (B) to the filler (C) being 1/(1.2–1.5)/(4–5) by volume.

BRIEF DESCRIPTION OF THE DRAWING

The FIGURE is a slant view illustrating an embodiment of the magnetic head of the present invention.

EMBODIMENTS OF THE INVENTION

Embodiment 1

In FIGURE is shown a slant view illustrating an embodiment of the magnetic head of the present invention. In the FIGURE, numeral 1 denotes a head core of the tunnel erase type, 2 a first slider, and 3 a second slider, which has a sliding surface 4 having an air groove 5 as a depression, the head core 1 being sandwiched between the first slider 2 and the second slider 3.

The first slider 2 and the second slider 3 each is made from a resin composition comprising an epoxy resin composition and a filler comprising (i) silica ($SiO_2$) as the main component and (ii) at least one minor component selected from alumina ($Al_2O_3$), mullite ($3Al_2O_3.2SiO_2$), calcium titanate ($CaTiO_3$), barium titanate ($BaTiO_3$), forsterite ($2MgO.SiO_2$), steatite ($MgO.SiO_2$) and zircon ($ZrO_2.SiO_2$), the amount of the minor component being from 3 to 30 wt %, preferably from 5 to 15 wt %, based on the main component, and wherein the amount of the filler is from 50 to 95 wt %, preferably from 65 to 85 wt %, based on the amount of the epoxy resin composition.

The incorporation of the filler containing silica having a low coefficient of thermal expansion ($5 \times 10^{-7}$ to $6 \times 10^{-7}$/° C.) as the main component into an epoxy resin composition having a high coefficient of thermal expansion ($600 \times 10^{-7}$ to $700 \times 10^{-7}$/° C.) in an amount of from 50 to 95% by weight based on the amount of the epoxy resin composition is effective in adjusting the coefficient of thermal expansion of the sliders to that of the head core comprising an Mn—Zn ferrite to thereby prevent the magnetic characteristics of the head core from deteriorating. Moreover, the minor component, which is at least one member selected from alumina, mullite, calcium titanate, barium titanate, forsterite, steatite, and zircon, contained in the filler comprising silica as the main component is effective in significantly diminishing the magnetic-head wear caused by sliding on floppy disks. Furthermore, since the addition amount of the minor component is regulated to from 3 to 30% by weight, media wear can also be significantly diminished.

The epoxy resin composition may contain at least one of epoxy resins represented by the following formulae (1), (2), (3), and (4), and further contain an acid anhydride, a curing accelerator, and a coupling agent as additives. The coupling agent comprises at least one member selected from epoxysilane coupling agents, phenylaminosilane coupling agents, mercaptosilane coupling agents, and titanate coupling agents.

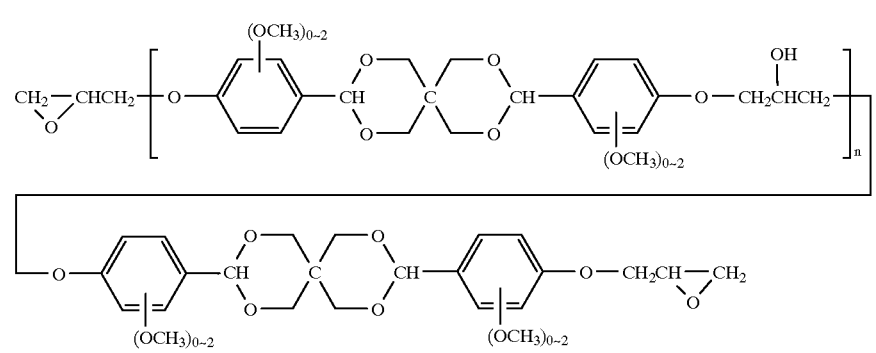

(1)

(In formula (1), n represents an integer of from 0 to 4 on the average.)

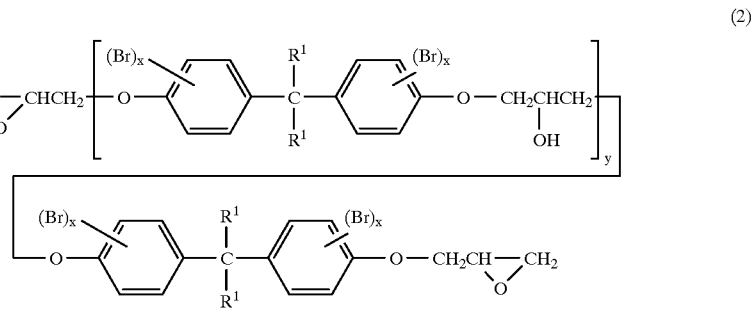

(2)

(In formula (2), $R^1$'s each independently represents a hydrogen atom or a methyl group, x's each independently represents an integer of from 1 to 4, and y represents an integer of from 0 to 4 on the average.)

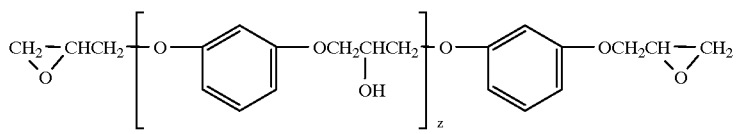

(3)

(In formula (3), z represents an integer of from 0 to 4 on the average.)

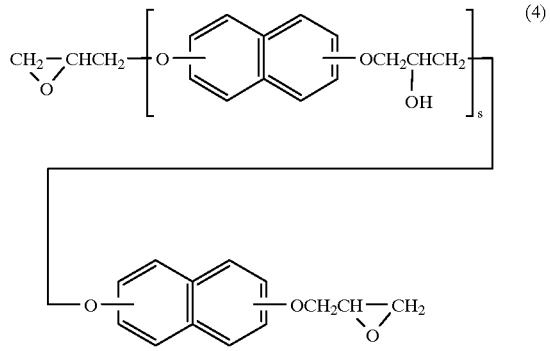

(4)

(In formula (4), s represents an integer of from 0 to 4 on the average.)

The epoxy resin composition may contain at least one of bisphenol A epoxy resins, bisphenol F epoxy resins, and epoxy resins having a biphenyl skeleton.

Those additives are incorporated in such proportions that the ratio of the number of the acid anhydride groups of the acid anhydride to the number of the epoxy groups of the epoxy resin is from 0.5 to 1.5, the amount of the curing accelerator is from 0.05 to 10 parts by weight per 100 parts by weight of the epoxy resin, and the amount of the coupling agent is from 0.5 to 5 parts by weight per 100 parts by weight of the epoxy resin.

Although conventional sliders consisting only of an oxide such as calcium titanate or barium titanate have a problem that they are apt to stick to a floppy disk during sliding because of the small contact angle between the slider and the lubricant contained in the magnetic layer of the floppy disk due to the surface tension of the lubricant, use of at least one epoxy resin selected from epoxy resins represented by formulae (1), (2), (3), and (4), bisphenol A epoxy resins, bisphenol F epoxy resins, and epoxy resins having a biphenyl skeleton brings about an increased contact angle with the lubricant to eliminate floppy disk/magnetic head sticking.

The addition of a solid filler to a liquid resin results in an increased viscosity, and this not only makes defoaming difficult but results in impaired processability. For attaining a reduced viscosity, it is necessary to use two or more kinds of fillers which have different and optimal particle diameters.

An appropriate viscosity is obtained by using three kinds of fillers which differ in particle diameter, i.e., a filler (A) having an average particle diameter of from 0.2 to 1.0 μm, a filler (B) having an average particle diameter from 10 to 15 times that of the filler (A), and a filler (C) having an average particle diameter from 50 to 80 times that of the filler (A), the proportion of the filler (A) to the filler (B) to the filler (C) being 1/(1.2–1.5)/(4–5) by volume. As a result, defoaming becomes easy and processability is improved.

The thus-prepared resin composition as a raw material is injected into molds respectively having cavities of the shapes of the first and second sliders 2 and 3 shown in FIGURE to produce the first slider 2 and the second slider 3.

The first slider 2 and second slider 3 thus produced are bonded with an epoxy adhesive to the head core 1 separately produced by processing an Mn—Zn ferrite, in such a manner that the core 1 is sandwiched between the sliders 2 and 3. Thus, a magnetic head is obtained.

The invention according to claim 1 produces the following effects. The incorporation of the filler containing silica having a low coefficient of thermal expansion ($5 \times 10^{-7}$ to $6 \times 10^{-7}$/°C.) as the main component into an epoxy resin composition having a high coefficient of thermal expansion ($600 \times 10^{-7}$ to $700 \times 10^{-7}$/° C.) in an amount of from 50 to 95% by weight based on the amount of the epoxy resin composition is effective in adjusting the coefficient of thermal expansion of the sliders to that of the head core comprising an Mn—Zn ferrite to thereby prevent the magnetic characteristics of the head core from deteriorating. Moreover, the minor component, which is at least one member selected from alumina, mullite, calcium titanate, barium titanate, forsterite, steatite, and zircon, contained in the filler comprising silica as the main component is effective in significantly diminishing the magnetic-head wear caused by sliding on floppy disks. Furthermore, since the addition amount of the minor component is regulated to from 3 to 30% by weight, media wear can also be significantly diminished.

The invention according to claims 2, 3, and 4 produces an effect that the sliders have an increased contact angle with the lubricant contained in the magnetic layer of a floppy disk, whereby floppy disk/magnetic head sticking is eliminated.

The invention according to claim 5 is advantageous in that the resin composition obtained as a raw material has an appropriate viscosity, can be easily defoamed, and has improved processability.

While the invention has been described in detail and with reference to specific embodiments thereof, it will be apparent to one skilled in the art that various changes and modifications can be made therein without departing from the spirit and scope thereof.

What is claimed is:

1. A magnetic head comprising a head core sandwiched between two sliders bonded thereto, said two sliders each being made from a resin composition, wherein said resin composition comprises:

an epoxy resin composition; and a filler comprising (i) silica ($SiO_2$) having a coefficient of thermal expansion of from $5 \times 10^{-7}$ to $6 \times 10^{-7}$/° C. as a main component and (ii) at least one component selected from the group consisting of alumina ($Al_2O_3$), mullite ($3Al_2O_3 \cdot 2SiO_2$), calcium titanate ($CaTiO_3$), barium titanate ($BaTiO_3$), forsterite ($2MgO \cdot SiO_2$), steatite ($MgO \cdot SiO_2$) and zircon ($ZrO_2 \cdot SiO_2$) as a minor component, the amount of the minor component being from 3 to 30 wt % based on the main component, and wherein the amount of the filler is from 50 to 95 wt % based on the epoxy resin composition.

2. The magnetic head as claimed in claim 1, wherein the epoxy resin composition contains at least one selected from the group consisting of epoxy resins represented by formulae (1) to (4):

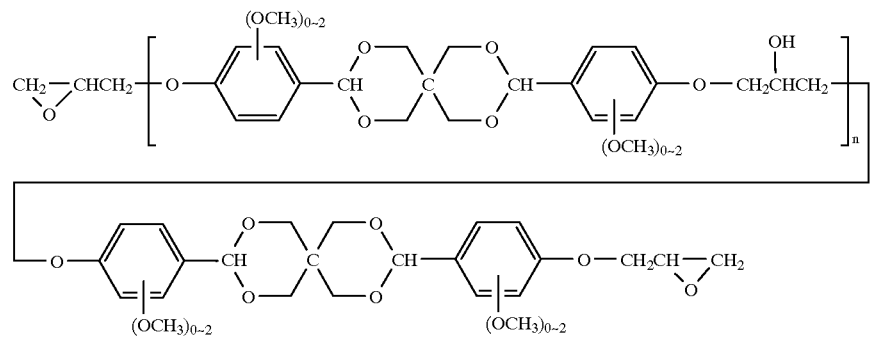

wherein n represents an integer of from 0 to 4 on the average;

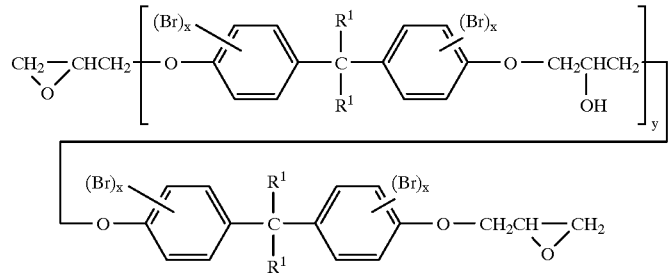

wherein $R^1$'s each independently represents a hydrogen atom or a methyl group; x's each independently represents an integer of from 1 to 4; and y represents an integer of from 0 to 4 on the average;

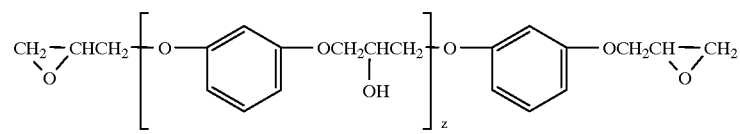

wherein z represents an integer of from 0 to 4 on the average;

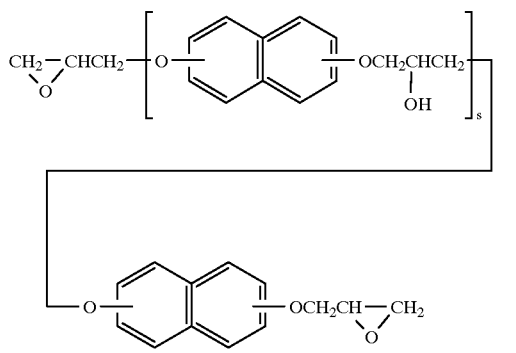

wherein s represents an integer of from 0 to 4 on the average.

3. The magnetic head as claimed in claim 1, wherein the epoxy resin composition contains at least one selected from the group consisting of a bisphenol A epoxy resin, a bisphenol F epoxy resin, and an epoxy resin having a biphenyl skeleton.

4. The magnetic head as claimed in claim 2, wherein the epoxy resin composition further contains as additives an acid anhydride, a curing accelerator and a coupling agent comprising at least one selected from the group consisting of an epoxysilane coupling agent, a phenylaminosilane coupling agent, a mercaptosilane coupling agent and a titanate coupling agent, and wherein the amount of the acid anhydride is such that the ratio of the number of the acid anhydride groups thereof to the number of the epoxy groups of the epoxy resin is from 0.5 to 1.5, the amount of the curing accelerator is from 0.05 to 10 parts by weight per 100 parts by weight of the epoxy resin, and the amount of the coupling agent is from 0.5 to 5 parts by weight per 100 parts by weight of the epoxy resin.

5. The magnetic head as claimed in claim 3, wherein the epoxy resin composition further contains as additives an acid anhydride, a curing accelerator and a coupling agent comprising at least one selected from the group consisting of an epoxysilane coupling agent, a phenylaminosilane coupling agent, a mercaptosilane coupling agent and a titanate coupling agent, and wherein the amount of the acid anhydride is such that the ratio of the number of the acid anhydride groups thereof to the number of the epoxy groups of the epoxy resin is from 0.5 to 1.5, the amount of the curing accelerator is from 0.05 to 10 parts by weight per 100 parts by weight of the epoxy resin, and the amount of the coupling agent is from 0.5 to 5 parts by weight per 100 parts by weight of the epoxy resin.

6. The magnetic head as claimed in claim 1, wherein the filler comprises a filler (A) having an average particle diameter of from 0.2 to 1.0 μm, a filler (B) having an average particle diameter from 10 to 15 times that of the filler (A), and a filler (C) having an average particle diameter from 50 to 80 times that of the filler (A), and wherein the proportion of the filler (B) to the filler (A) is 1.2 to 1.5 by volume and the proportion of the filler (C) to the filler (A) is 4 to 5 by volume.

* * * * *